US008689147B2

(12) United States Patent  (10) Patent No.: US 8,689,147 B2
Griffin et al.  (45) Date of Patent: Apr. 1, 2014

(54) SYSTEM AND METHOD FOR USING NAVIGATIONAL AND OTHER COMMANDS ON A MOBILE COMMUNICATION DEVICE

(75) Inventors: Jason T. Griffin, Kitchener (CA); Andrew Bocking, Waterloo (CA); Sherryl Lee Lorraine Scott, Toronto (CA); Harry Major, Waterloo (CA); David Yach, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 11/532,409

(22) Filed: Sep. 15, 2006

(65) Prior Publication Data

US 2007/0080954 A1  Apr. 12, 2007

Related U.S. Application Data

(60) Provisional application No. 60/724,458, filed on Oct. 7, 2005, provisional application No. 60/755,268, filed on Dec. 30, 2005.

(51) Int. Cl.
  *G06F 3/00* (2006.01)
  *G09G 5/00* (2006.01)
(52) U.S. Cl.
  USPC ............................ 715/866; 345/156; 345/172
(58) Field of Classification Search
  USPC ............. 715/864, 866; 348/333.1; 455/550.1, 455/566.1, 553.1, 556.1, 556.2; 345/156, 345/169, 168, 172, 173, 174, 175, 176, 177, 345/178, 179
  See application file for complete search history.

(56) References Cited

U.S. PATENT DOCUMENTS

| 6,219,694 | B1  |  4/2001 | Lazaridis et al. |
| 6,307,541 | B1* | 10/2001 | Ho et al. ........................ 345/171 |
| 6,307,549 | B1  | 10/2001 | King |
| 6,483,913 | B1* | 11/2002 | Smith ........................... 379/368 |
| 7,461,350 | B2* | 12/2008 | Salo et al. ..................... 715/773 |

(Continued)

FOREIGN PATENT DOCUMENTS

| EP | 1593997 A1 * | 11/2005 |
| FR | 2806491 A1   |  9/2001 |

(Continued)

OTHER PUBLICATIONS

European Search Report for EP06120766, Issued on Mar. 1, 2007.

(Continued)

*Primary Examiner* — Rashawn Tillery
(74) *Attorney, Agent, or Firm* — Novak Druce Connolly Bove + Quigg LLP

(57) ABSTRACT

A wireless handheld communication device having a housing containing a display screen located above a physical keyboard. The keyboard includes a plurality of physical keys and corresponding indicia. Some of the keys are associated with alphabetic characters corresponding to a QWERTY array of letters A-Z and some are associated with numeric characters 0-9 corresponding to a telephone keypad arrangement. At least some of the keys associated with numeric characters are overlaid on the physical keys associated with alphabetic characters. A microprocessor is included that runs the device in at least a telephony mode, an email mode and at least one additional mode. The microprocessor displays a key-function map on the display screen indicative of enabled functions associated with particular physical keys of the keyboard which are different from any function signified by the indicia associated with the respective particular physical key.

20 Claims, 7 Drawing Sheets

(56) References Cited

U.S. PATENT DOCUMENTS

| | | | |
|---|---|---|---|
| 2003/0201982 A1* | 10/2003 | Iesaka | 345/168 |
| 2004/0036632 A1* | 2/2004 | Ford | 341/22 |
| 2004/0087350 A1* | 5/2004 | Nagasawa | 455/572 |
| 2004/0113956 A1* | 6/2004 | Bellwood et al. | 345/863 |
| 2004/0174400 A1* | 9/2004 | Herigstad et al. | 345/864 |
| 2006/0071908 A1* | 4/2006 | Rehbock | 345/168 |
| 2006/0146174 A1* | 7/2006 | Hagino | 348/349 |
| 2006/0242592 A1* | 10/2006 | Edwards et al. | 715/764 |
| 2006/0270444 A1* | 11/2006 | Miramontes | 455/550.1 |
| 2007/0035523 A1* | 2/2007 | Cohen | 345/169 |
| 2007/0042805 A1* | 2/2007 | Jarczyk | 455/556.2 |
| 2007/0051792 A1* | 3/2007 | Wheeler et al. | 235/375 |
| 2007/0281747 A1* | 12/2007 | Pletikosa et al. | 455/564 |
| 2007/0286596 A1* | 12/2007 | Lonn | 396/429 |
| 2008/0256485 A1* | 10/2008 | Krikorian | 715/810 |

FOREIGN PATENT DOCUMENTS

| | | | |
|---|---|---|---|
| FR | 2837942 A1 | 10/2003 | |
| WO | 9833111 A | 7/1998 | |
| WO | 2005064442 A | 7/2005 | |
| WO | 2006094130 | 9/2006 | |

OTHER PUBLICATIONS

Examination Report; EPA 06120766.8; Aug. 6, 2008.
EP10152338.9 Extended European Search Report (May 17, 2010).
Office Action mailed Sep. 6, 2012, in corresponding Canadian patent application No. 2,602,877.
Office Action mailed Aug. 18, 2011, in corresponding Canadian patent application No. 2,602,877.
Office Action mailed May 25, 2010, in corresponding Canadian patent application No. 2,602,877.
Second Office Action mailed May 4, 2011, in corresponding Chinese patent application No. 200710305775.X.
English translation of the First Office Action mailed Nov. 12, 2010, in corresponding Chinese patent application No. 200710305775.X.
First Office Action mailed Nov. 12, 2010, in corresponding Chinese patent application No. 200710305775.X.
First Office Action mailed Jun. 26, 2013, in corresponding Chinese patent application No. 2011102772949.
Examination report mailed Jul. 29, 2011, in corresponding European patent application No. 10152338.9.
Summons to attend oral proceedings pursuant to Rule 115 (1) EPC mailed Aug. 31, 2009, in corresponding European patent application No. 06120766.8.
English translation for First Office Action mailed Jun. 26, 2013, in corresponding Chinese patent application No. 2011102772949.
Second Office Action mailed Nov. 12, 2013, in corresponding Chinese patent application No. 201110277294.9.
English translation of the Second Office Action mailed Nov. 12, 2013, in corresponding Chinese patent application No. 201110277294.9.

* cited by examiner

SYSTEM AND METHOD FOR USING NAVIGATIONAL AND OTHER COMMANDS ON A MOBILE COMMUNICATION DEVICE

CROSS-REFERENCE TO RELATED APPLICATIONS

The present application claims the benefit of U.S. Provisional Application Nos. 60/724,458 and 60/755,268 filed Oct. 7, 2005 and Dec. 30, 2005, respectively, and the disclosures of which are hereby expressly incorporated by reference.

FIELD

This disclosure concerns a navigational system and a shortcut help screen for an electronic device. In particular, this disclosure concerns a navigational system and shortcut help screen for the keyboard of a handheld mobile communication device.

BACKGROUND

Current mobile communication devices have programmed shortcut commands that are associated with keys on the keyboard. A shortcut command as used in this specification is a command that is associated with a key but that is not printed on the key. Because the shortcut information is not printed on the keys, a user must memorize the shortcut information or look the information up in a manual before using the commands. Many users are not even aware that the shortcut commands are present on the device.

The shortcut commands are useful because they allow a user to navigate within certain modes of the device more easily and provide additional functions, such as functions that were previously associated with navigation keys present on a device housing or as a separate part of the keyboard, or for other functions that would otherwise require several key presses or navigation through a menu to activate. Typically, the same shortcut keys are not used throughout all applications on a device.

BRIEF DESCRIPTION OF THE DRAWINGS

Exemplary methods and arrangements conducted and configured according to the advantageous solutions presented herein are depicted in the accompanying drawings wherein.

DETAILED DESCRIPTION

This disclosure concerns a mobile communication device having a reduced format keyboard as described, for example, in U.S. patent application Ser. No. 10/785,790, the disclosure of which is incorporated herein by reference in its entirety. A reduced format keyboard includes alphabetic characters A-Z that are arranged in a standard alphabetic keyboard format, for example, a QWERTY, QWERTZ, AZERTY, or DVORAK format. The alphabetic characters are presented on fewer than twenty-six keys, such that some alphabetic characters share keys with other alphabetic characters. The keyboard also includes a numeric phone arrangement of numbers 0-9. The mobile communication device may be used for sending and receiving phone calls and for sending and receiving emails, among other types of messages, such as SMS or otherwise. A keyboard including twenty-six keys for the twenty-six letters of the alphabet may also be utilized with the teachings of this disclosure.

Shortcut commands can be used in the phone mode, email mode, SMS mode, internet browser mode, typing mode, calendar mode, scheduling mode, or game mode. Other modes are also anticipated to derive benefit from this disclosure, which is not limited to only these modes. These commands may include navigational commands or other functions such as copy, paste, mode switch, mute, compose message, reply, forward message, reply to all, among others. Some of the shortcut commands, such as the navigational commands, can be used throughout all applications. The shortcut commands can be triggered by pressing or holding a second key, or in some applications the shortcut command may be the primary function of the key, and the command may be triggered without pressing any additional key. Shortcut commands are particularly beneficial in reduced keyboards because there are fewer keys for implementing the many functions that today's users require.

The examples described herein concern a technique for displaying instructions on the display screen of a mobile communication device in order to make the shortcut commands more readily usable. The instructions provide visual mapping to the keys to allow the user to select functions associated with particular keys in each mode. A different set of instructions may be provided for each mode, and therefore context specific.

Figure 1:
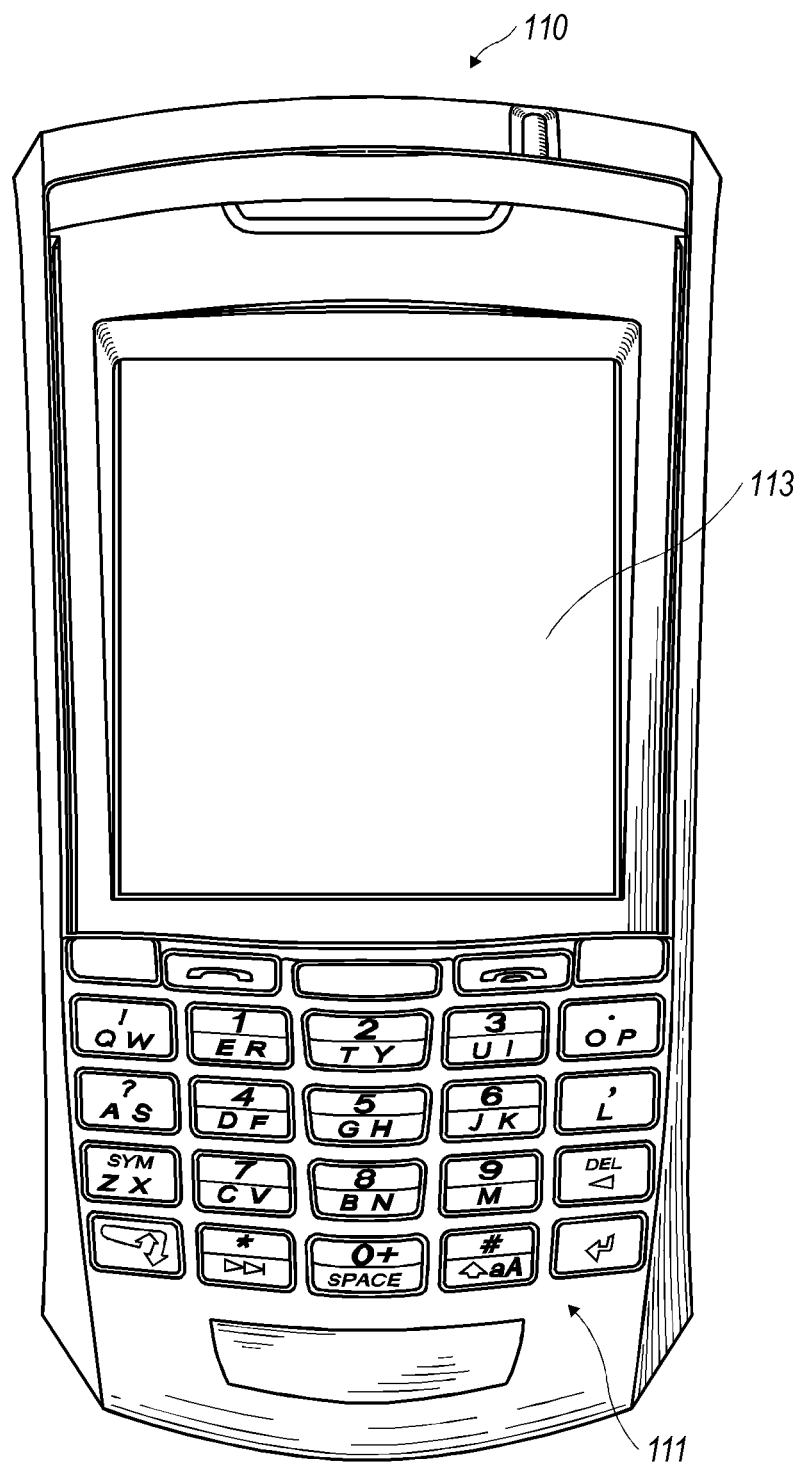
FIG. 1 is a front view of an exemplary mobile communication device of the types disclosed herein.

FIG. 1 shows an example mobile device 110 that has a keypad 111 and a display screen 113. The keys of the keypad include a reduced QWERTY letter arrangement. Indicia associated with each key are displayed on the keys. An ITU standard E.161 numeric phone key layout is overlaid on the three middle columns of the keypad.

Figure 2:
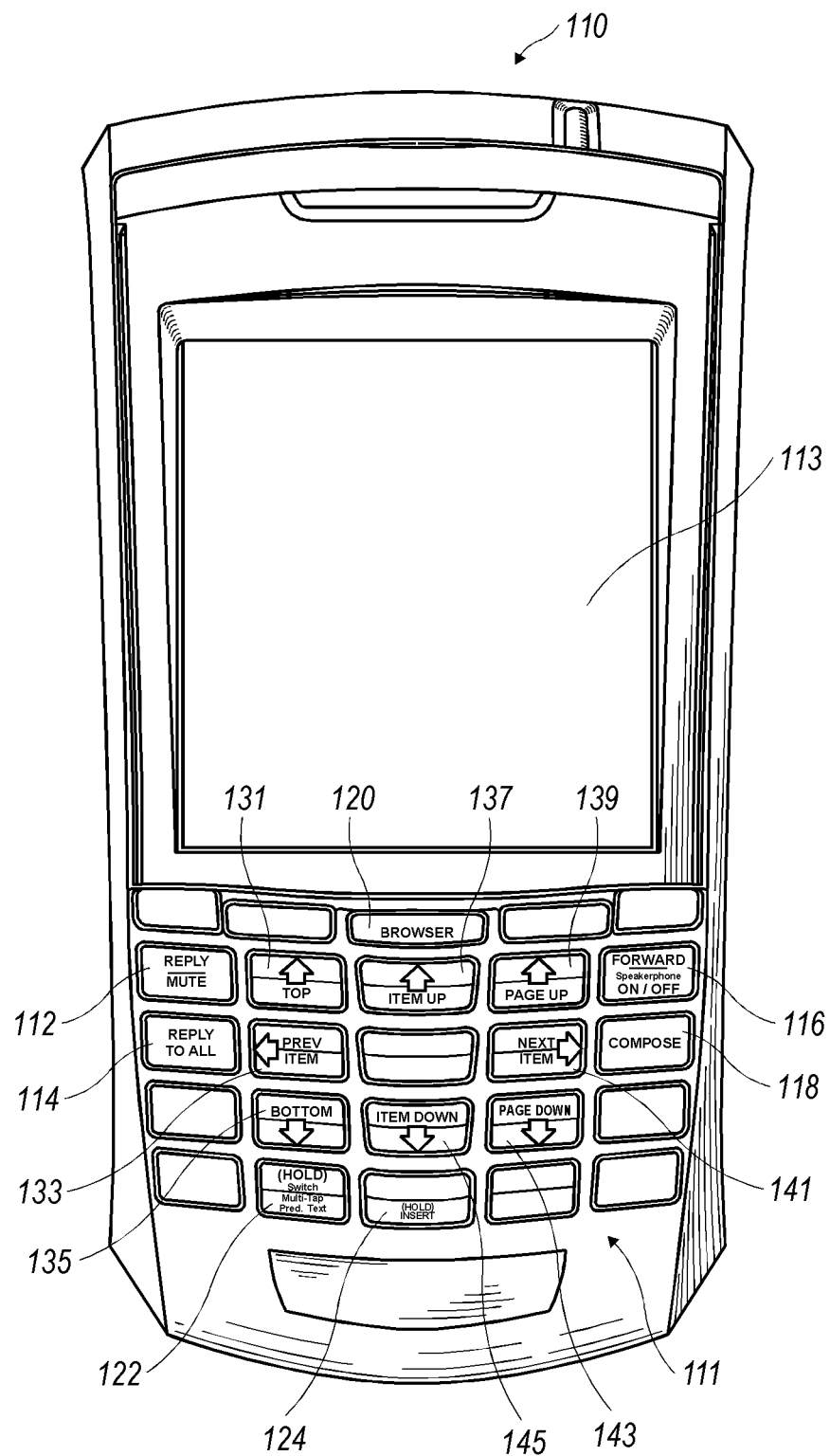
FIG. 2 is a front view of the example mobile communication device of FIG. 1, showing some example shortcut functions associated with the keys of the keyboard.

Referring now to FIG. 2, a plurality of shortcut commands are programmed in the example mobile communication device 110 and are shown on the keypad 111. The commands shown in FIG. 2 are not actually printed on the keys, but are only illustrative of their shortcut functions. The indicia shown in FIG. 1, on the other hand, would in fact be present on the face of the keys. The key labeled 112 is associated with two shortcut commands: reply, when in the e-mail mode, and mute, when in the phone mode. The key labeled 114 will open a message replying to all when pressed in e-mail mode. The key labeled 116 also has two shortcut functions: turning the speakerphone on or off in the phone mode, and forwarding an e-mail in e-mail mode. The key labeled 118 will open a new e-mail message when pressed in the e-mail mode. Pressing the wide key 120 at the top of the keypad 111 will command the mobile communication device 110 to start the internet browser mode. This shortcut may be effective in all modes to serve the same function. The key labeled 122 has the shortcut function of switching from a multiple tap mode to a predictive text mode for typing on a reduced format keyboard. The words "(hold)" indicate that to activate this shortcut the key must be held down for a short time. Holding down the wide key 124 at the bottom of the keypad 111 has the shortcut function of inserting a plus symbol in the phone mode.

The remaining shortcut commands on the example mobile communication device 110 are navigational shortcuts. These commands are useful throughout all modes of this example mobile communication device 110. The shortcut function of the key labeled 131 will cause the current view to scroll all the way to the top of the material displayed on the display screen 113, also referred to herein as the graphical user interface. This key 131 is paired with the key labeled 135, which will scroll all the way to the bottom of the graphical user interface. The shortcut function for the key labeled 133 will move the view or the cursor to a previous item, wich may move the cursor or the view to the left as indicated by the arrow. This key 133 is paired with the key labeled 141, which has the shortcut function of moving the cursor or view to the next item, which may be to the right. The shortcut function of the keys labeled 137 and 145 will move a cursor or view up or down, respectively. The shortcut function of the keys labeled 139 and 143 will cause the view to move up or down, respectively, by an approximate screen size.

Figure 3:
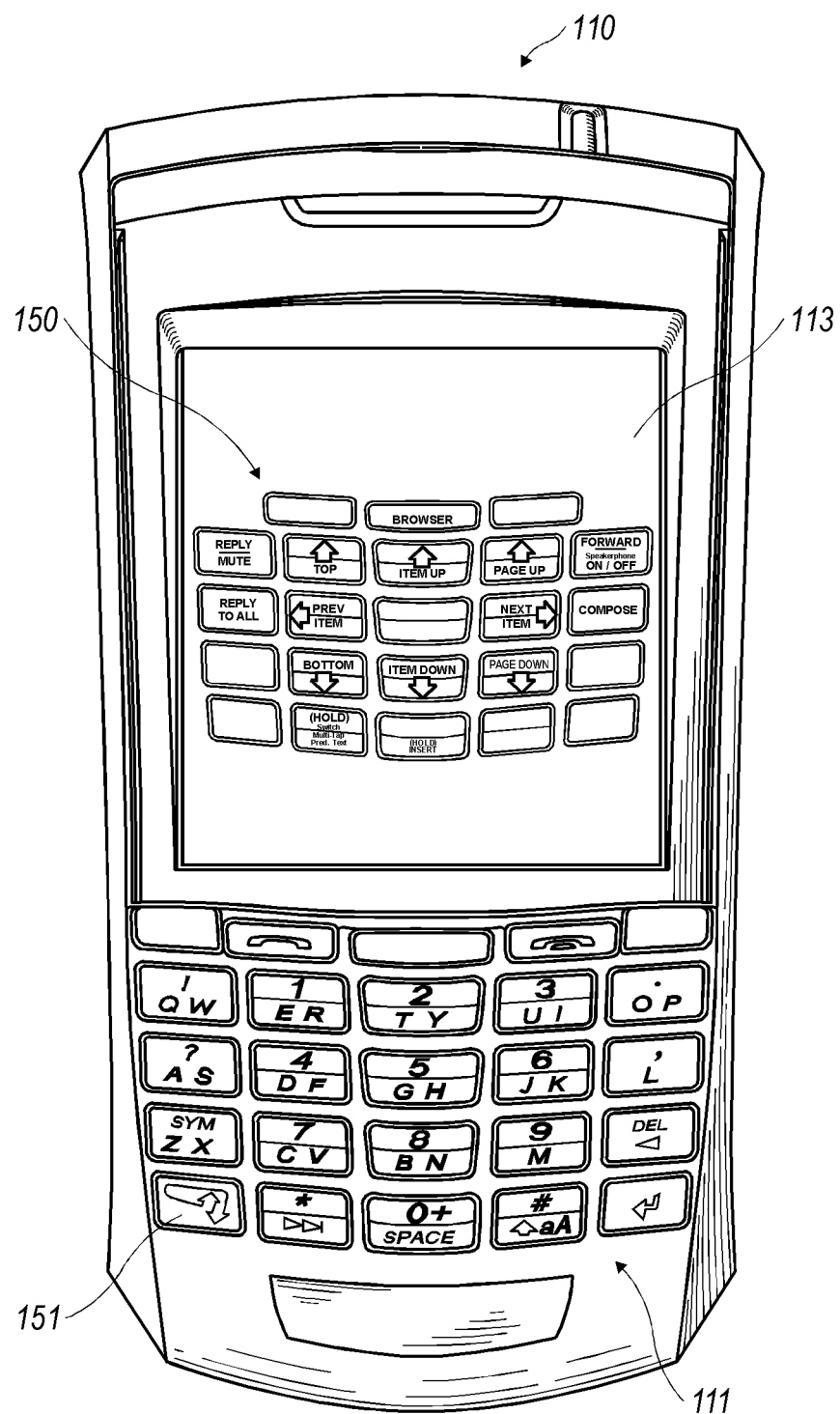
FIG. 3 is a front view of the example mobile communication device of FIG. 1, showing a shortcut help screen for multiple applications or modes on the display.

As shown in FIG. 3, the device is programmed such that a shortcut help screen 150 displays on the display screen 113 when a user is in need of assistance with the shortcut functions associated with the keys. The shortcut help screen 150 shows a virtual representation or mapping of the keyboard 111. In this example, the virtual representation depicts keys with approximate shapes and sizes of the keys on the keyboard 111. In other examples, the shortcut help screen may convey help information in some other manner that informs the user of the functions that are related to one or more keys.

In this example, there is a virtual representation or mapping of the entire keyboard 111. However, in other examples, only a portion of the keyboard 111 may be represented. For example, only the keys that have shortcut navigational function may be virtually represented on the help screen. This would be a more specific help screen that only conveys navigational information to the user. In another example, such as the calculator function depicted in FIG. 6, only the bottom four rows are virtually represented on the display screen. By not virtually representing all of the keys on the keypad but only the portion that is associated with shortcut functions, there is extra space on the screen for viewing the underlying application. This extra space could also be utilized by representing the keys in a larger view. This would be beneficial for displaying longer shortcut messages on each key.

The shortcut help screen 150 can be displayed on the screen 113 either automatically, such as when a user switches modes, or by command of the user. With the latter, the user enters a command which is easily memorized on the keyboard 111 or elsewhere on the device 110, and the shortcut help information may then be displayed on the screen 113, with context specific instructions depending upon the mode that the device 110 is operating in. In one example, a control key such as the current alt key 151 may be activated by a user in order to pull up the shortcut help information. It is beneficial if a single key, such as a "hot key," is used to pull up the shortcut help information in each mode, but it is also possible that different keys could be utilized to pull up the shortcut help information. It is desired that the control key command that allows the user to pull up the shortcut help screen 150 on the display screen 113 be easy for a user to remember so that a user is no longer required to remember all the shortcut commands.

The shortcut help screen 150 may automatically terminate when the user selects one of the shortcut keys. For example, if the user is in message mode, the user may select the "top" shortcut key. This may automatically cause the shortcut help screen 150 to disappear and reveal the email message that is being navigated. The shortcut help screen 150 may also terminate to reveal the content of the underlying program mode upon command of the user, such as by tapping the ALT key. Alternatively, the shortcut help screen 150 may terminate after a short time period. Either or a combination of techniques may be provided. In addition, a thumbwheel (typically installed on the side of the device or elsewhere on the device (not shown)) or other auxiliary input device may be utilized in connection with the shortcut help screen 150 either as a control key, to assist in clearing the navigational information from the screen, or in a different manner.

The example help screen 150 shown in FIG. 3 combines some shortcuts that are used across all applications or modes, and some shortcuts that are used only in one or a few applications or modes. An alternative to this is to program multiple shortcut help screens for each mode of the example device 110. In that case, the example device 110 would beneficially be programmed to determine which mode or application was current and open the help screen associated with the current mode. Alternatively, if desired, the user could manually select a help screen.

Figure 4:
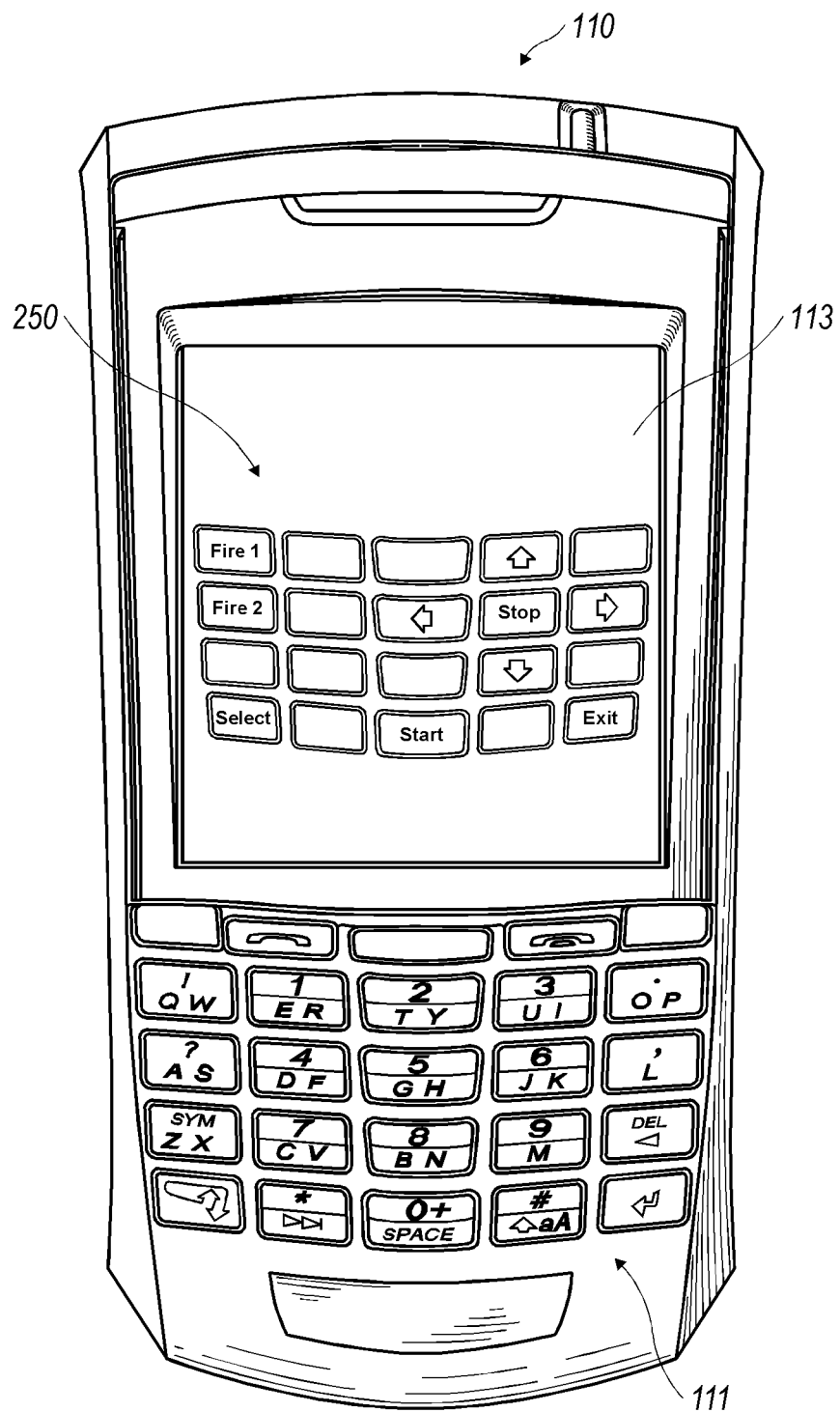
FIG. 4 is a front view of the example mobile communication device of FIG. 1, showing a second shortcut help screen for a game on the display.

For example, as shown in FIG. 4, a game may have a shortcut help screen 250 that informs the user of the functions of the keys when the game becomes active. This help screen 250 does not show the other shortcut functions when the device 110 is in other modes or running other applications, but is tailored to only the game application. This shortcut help screen 250 does not show the entire keypad 111, but only a selected portion. In particular, for example, it does not include the top three keys. Other game applications that may be available to run on the mobile communication device 110 may have different help screens that are specific to each particular game. Programs that include a help screen could be downloaded or ported in some other way to the example mobile communication device 110.

Another feature, namely, programming to allow user-configuration of shortcuts, may be provided on the example mobile communication device 110 and may be used in conjunction with the help screen feature. The example mobile device 110 includes programming that allows users to configure and link shortcut functions to certain applications. For example, a separate user configuration program may be provided for customizing shortcut keys. The device would implement the user-entered information by associating new shortcut functions with the specified keys in the specified modes or application and generate a customized help screen associated with the application or mode.

Figure 5:
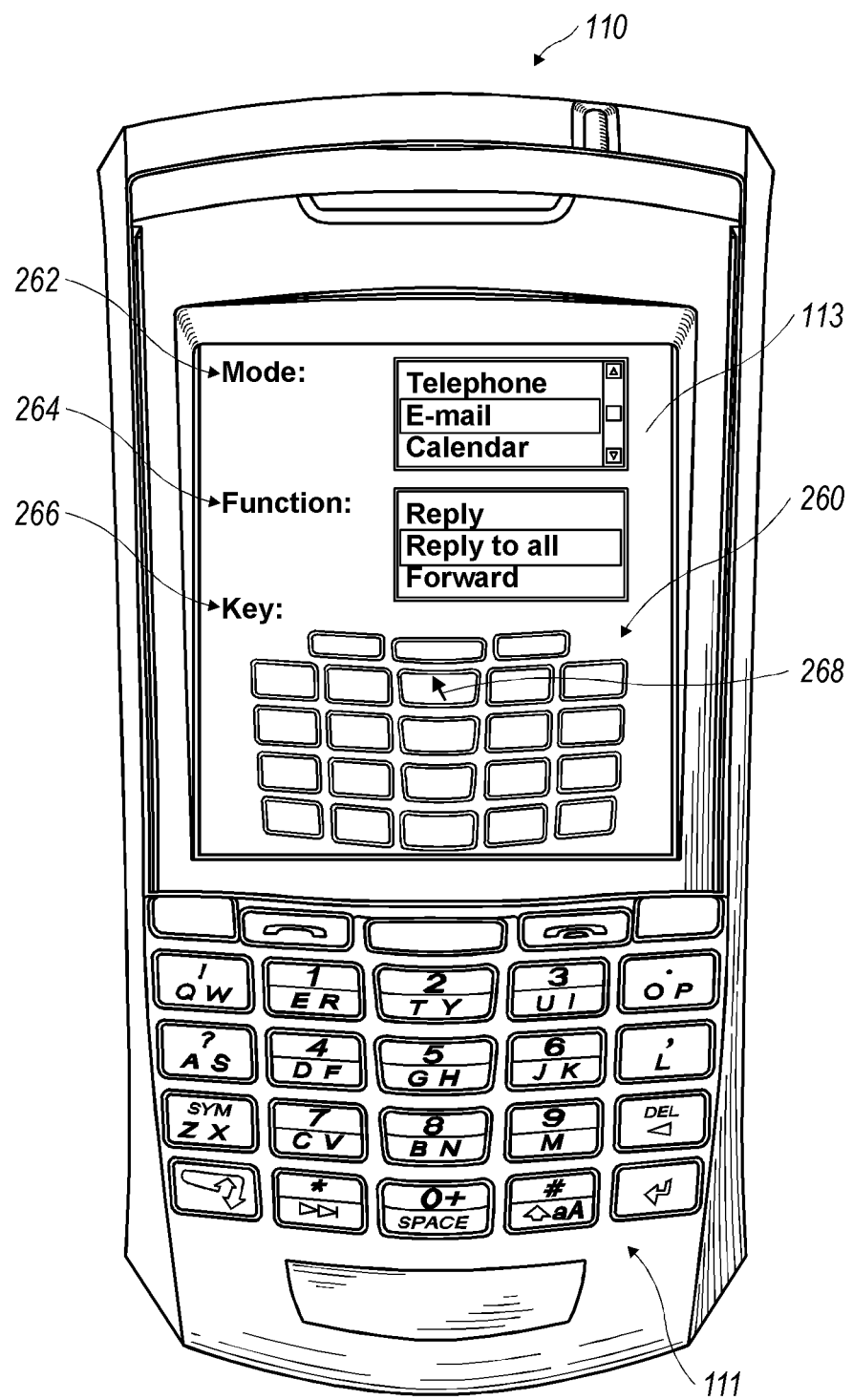
FIG. 5 is front view of the example mobile communication device of FIG. 1, showing a shortcut customization or programming screen on the display.

In FIG. 5, an example configuration screen 260 is shown on the display screen 113. For example, the programming may provide for a mode field 262 for a user to select a mode or application. This may be selected by scrolling through a list with the thumbwheel of the device and pressing the thumbwheel when the item to be selected is displayed or highlighted. After selecting a mode or application, a list of functions that correspond to the chosen application or mode populates a function field 264. The user then selects a function from the field 264 in the same or a different manner. Finally, the user selects a key to associate with the chosen function of the chosen mode. The key selection may, for example, be made by moving a cursor 268 over a virtual representation of the keyboard 266 and selecting it. The customizable shortcut keys may be provided in addition to preprogrammed shortcut keys.

The mobile communication device may include programming to automatically generate a custom help screen based on the information entered by the user. The custom help screen may be a single screen displayed in all modes that shows all the shortcut commands, such as the help screen 150 of FIG. 2, or there may be multiple custom help screens that each correspond to an associated mode, such as the help screen of FIG. 4.

Figure 6:
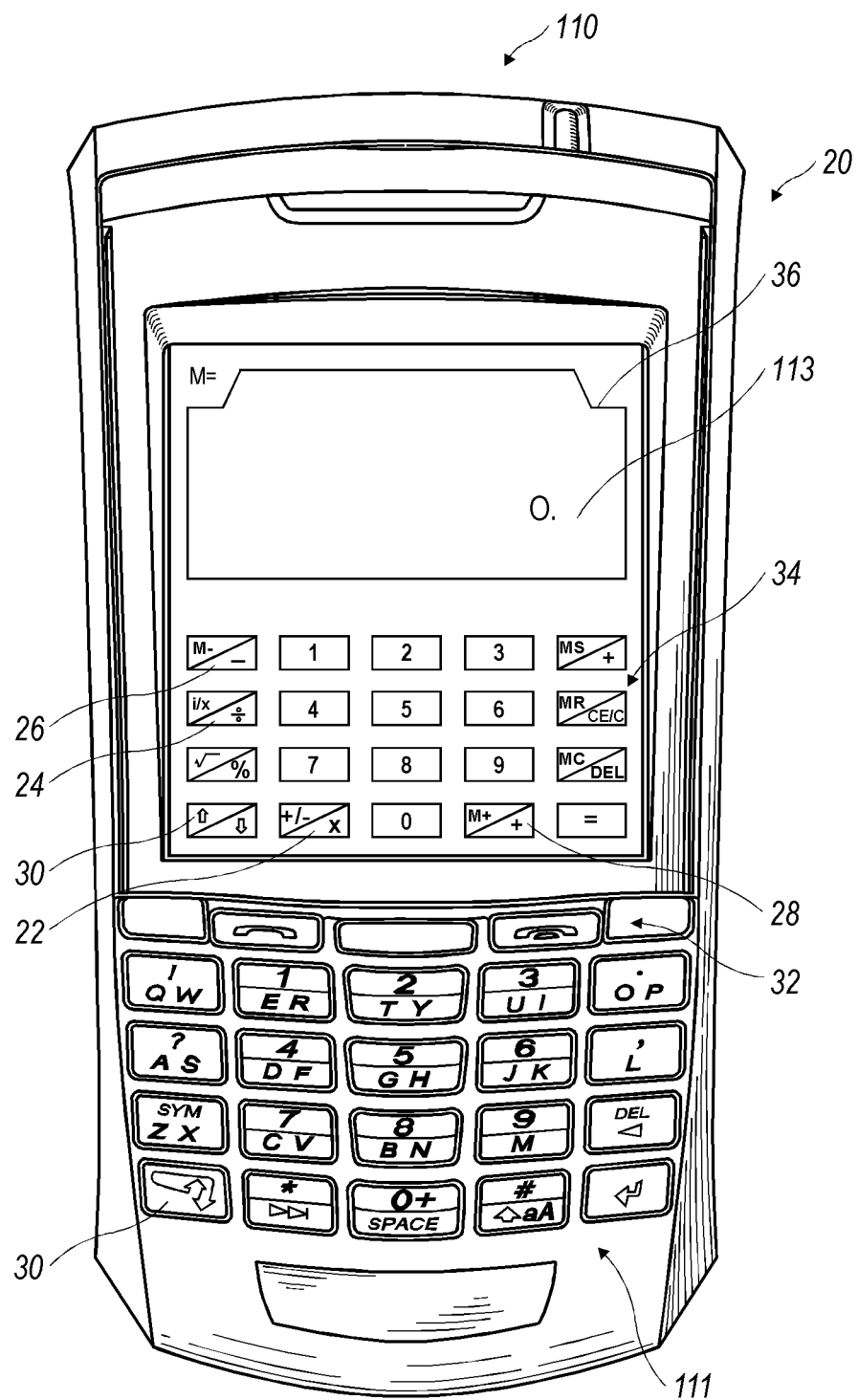
FIG. 6 is a front view of the example mobile communication device of FIG. 1, showing the shortcut commands on the screen of the display when in calculator mode.

FIG. 6 depicts shortcut commands that are present in the calculator mode 20. The calculator mode 20 may be entered by any method. In one example, the user scrolls through a list of options on the display screen and may highlight and select the "calculator" function, which puts the device into calculator mode 20. While the user can input numbers using the keys 111 that are already labeled with numbers, other functions associated with calculator functions are not readily evident from the face of the keypad 111. For example, multiplication (×) 22, division (÷) 24, subtraction (−) 26, and addition (+) 28 symbols are not present on the keys 111 of the keypad. The keypad, however, is programmed in calculator mode 20 such that some keys serve as shortcuts for these and other functions.

Examples of the shortcuts are depicted on the reference screen 34 of the display 113 in FIG. 6. The shortcut commands depicted include memory functions, 1/x, ÷, square root, percentage, ÷, +, −, =, DEL, CE/C, ., and ±. A shift key 30 is also provided in the same place on the keyboard as is labeled on the keys, to allow some of the keys to serve multiple functions. When the shift key is selected, the functions identified on the top part of the dual function keys is selected (see keys 22, 24, 26, 28, for example). Other calculator functions may be alternatively utilized. For example, the top three keys in the upper row 32 could also be used in calculator mode 20 for additional functions, such as business or mathematic functions, among other functions. The calculator shortcuts are not limited to only those which are shown. Other or additional calculator functions may alternatively be used. In addition, while the numbered keys correspond to the numbers shown on the display 113, it is possible that the numbers associated with keys could be different from what is printed on the keys when in calculator mode 20. For example, the calculator numbers could be associated with the left three columns or the right three columns of keys in a calculator mode 20. The user would then use the reference screen 34 to select the appropriate numbers and functions.

The display 113 in FIG. 6 includes the shortcut commands on the reference screen 34 and other keys associated with the calculator, and also includes a box 36 near the top of the display where numbers and results are displayed. Thus, the display 113 in this case serves as both a navigational screen via the reference help screen portion 34 and a display screen 36 for displaying the results of the calculation. The calculator help screen in a preferred example stays visible on the display screen as long as the calculator function is selected.

Figure 7:
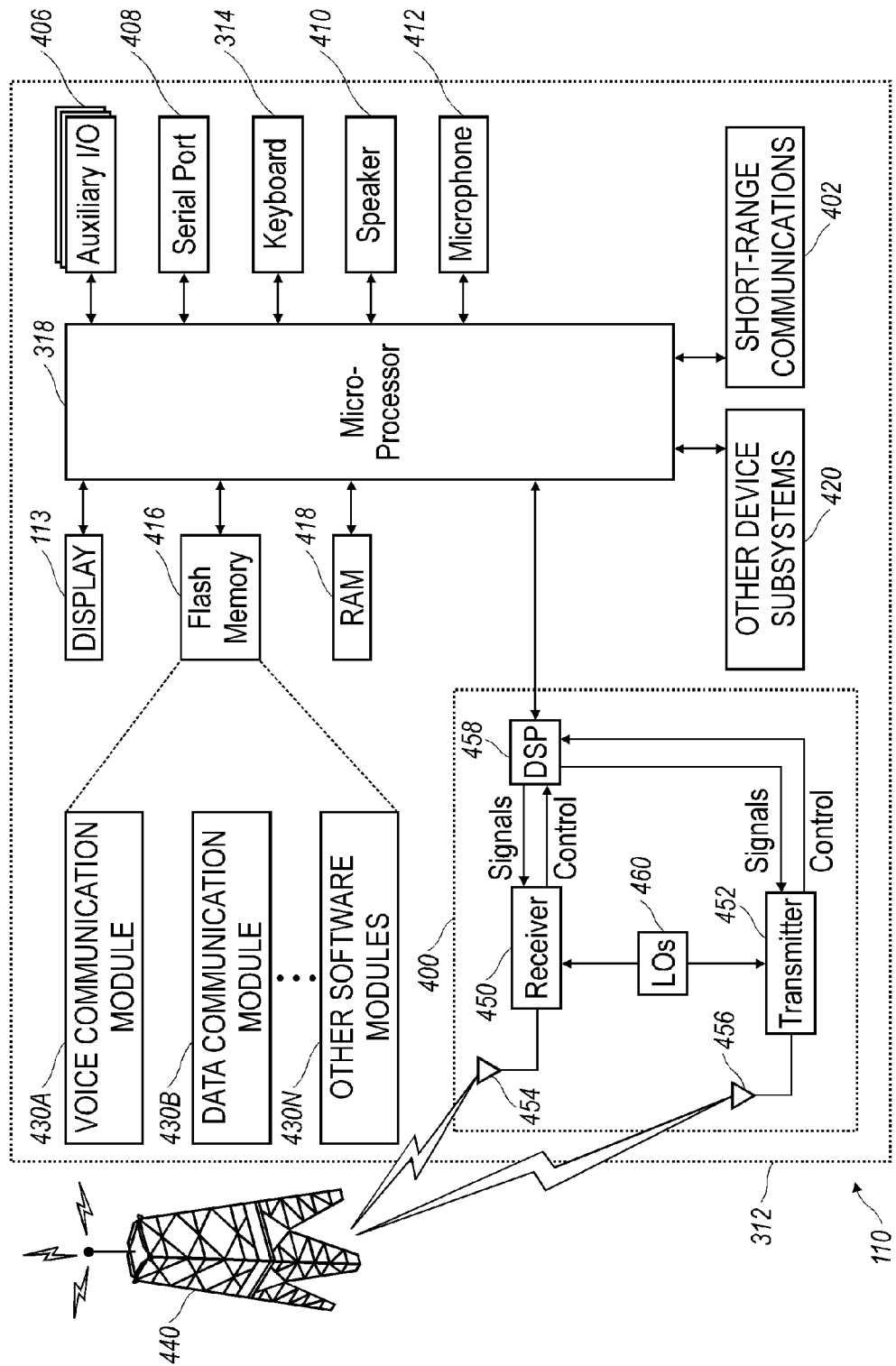
FIG. 7 is a schematic for an example mobile communication device operating in a wireless communication system.

The mobile communication devices presented in FIGS. 1-6 include similar features, such as a housing, a keyboard, and an output device. These and other features are shown schematically in FIG. 7. The output device shown is a display 113, which is preferably a full graphic LCD. Other types of output devices may alternatively be utilized. A processing device 318, which is shown schematically in FIG. 7, is contained within the housing 312 and is coupled between the keyboard 314 and the display 113. The processing device 318 controls the operation of the display 113, as well as the overall operation of the mobile communication device 110, in response to actuation of keys on the keyboard 314 by the user.

The housing 312 may be elongated vertically, or may take on other sizes and shapes, including a clamshell housing structure, among other structures. The keyboard may include a mode selection key, or other hardware or software for switching between text entry and telephony entry.

In addition to the processing device 318, other parts of the mobile communication device 110 are shown schematically in FIG. 7. These include a communications subsystem 400; a short-range communications subsystem 402; the keyboard 314 and the display 113, along with other input/output devices 406, 408, 410, and 412; memory devices 416, 418; and various other device subsystems 420. The mobile communication device 110 is preferably a two-way RF communication device having voice and data communication capabilities. In addition, the mobile communication device 110 preferably has the capability to communicate with other computer systems via the Internet.

Operating system software executed by the processing device 318 is preferably stored in a persistent store, such as a flash memory 416, but may be stored in other types of memory devices such as a read only memory (ROM) or similar storage element. In addition, system software, specific device applications, or parts thereof, may be temporarily loaded into a volatile store such as a random access memory (RAM) 418. Communication signals received by the mobile communication device may also be stored to the RAM 418.

The processing device 318, in addition to its operating system functions, enables execution of software applications 430A-430N on the device 110. A predetermined set of applications that control basic device operations, such as data and voice communications 430A and 430B, may be installed on the device 110 during manufacture. In addition, a personal information manager (PIM) application may be installed during manufacture. The PIM is preferably capable of organizing and managing data items such as e-mail, calendar events, voice mails, appointments, and task items. The PIM application is also preferably capable of sending and receiving data items via a wireless network 440. Preferably, the PIM data items are seamlessly integrated, synchronized, and updated via the wireless network 440 with the device user's corresponding data items stored or associated with a host computer system. An example system and method for accomplishing these steps is disclosed in "System And Method For Pushing Information From A Host System To A Mobile Device Having A Shared Electronic Address," U.S. Pat. No. 6,219,694, which is owned by the assignee of the present application and incorporated herein by reference.

Communication functions, including data and voice communications, are performed through the communication subsystem 400 and possibly through the short-range communications subsystem. The communication subsystem 400 includes a receiver 450, a transmitter 452, and one or more antennas 454, 456. In addition, the communication subsystem 400 also includes a processing module such as a digital signal processor (DSP) 458 and local oscillators (LOs) 460. The specific design and implementation of the communication subsystem 400 is dependent upon the communication network in which the mobile communication device 110 is intended to operate. For example, a mobile communication device 110 may include a communication subsystem 400 designed to operate with the Mobitex™, Data TAC™ or General Packet Radio Service (GPRS) mobile data communication networks and also designed to operate with any of a variety of voice communication networks such as AMPS, TDMA, CDMA, PCS, GSM, etc. Other types of data and voice networks, both separate and integrated, may also be utilized with the mobile communication device 110.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile communication device 110 may send and receive communication signals over the communication network 440. Signals received from the communication network 440 by the antenna 454 are routed to the receiver 450, which provides for signal amplification, frequency down-conversion, filtering, channel selection, etc., and may also provide analog-to-digital conversion. Analog-to-digital conversion of the received signal allows the DSP 458 to perform more complex communication functions such as demodulation and decoding. In a similar manner, signals to be transmitted to the network 440 are processed (e.g. modulated and encoded) by the DSP 458 and are then provided to the transmitter 452 for digital-to-analog conversion, frequency up-conversion, filtering, amplification, and transmission to the communication network 440 (or networks) via the antenna 456.

In addition to processing communication signals, the DSP 458 provides for control of the receiver 450 and the transmitter 452. For example, gains applied to communication signals in the receiver 450 and transmitter 452 may be adaptively controlled through automatic gain control algorithms implemented in the DSP 458.

In a data communication mode, a received signal such as a text message or web page download is processed by the communication subsystem 400 and is input to the processing device 318. The received signal is then further processed by the processing device 318 for an output to the display 113, or alternatively to some other auxiliary I/O device 406. A device user may also compose data items such as e-mail messages using the keyboard 314 and/or some other auxiliary I/O device 406 such as a touchpad, a rocker switch, a thumbwheel, or other type of input device. The composed data items may then be transmitted over the communication network 440 via the communication subsystem 400.

In a voice communication mode, overall operation of the device is substantially similar to the data communication mode except that received signals are output to a speaker 410 and signals for transmission are generated by a microphone 412. Alternative voice or audio I/O subsystems such as a voice message recording subsystem may also be implemented on the device 110. In addition, the display 113 may also be utilized in voice communication mode, for example to display the identity of a calling party, the duration of a voice call, or other voice call related information.

The short-range communications subsystem enables communication between the mobile communication device 110 and other proximate systems or devices, which need not necessarily be similar devices. For example, the short-range communications subsystem may include an infrared device and associated circuits and components, or a Bluetooth™ communication module to provide for communication with similarly enabled systems and devices.

While various features of the claimed embodiments are presented above, it should be understood that the features may be used singly or in any combination thereof Therefore, the claimed embodiments are not to be limited to only the specific embodiments depicted herein.

Further, it should be understood that variations and modifications may occur to those skilled in the art to which the claimed embodiments pertain. The embodiments described herein are exemplary. The disclosure may enable those skilled in the art to make and use embodiments having alternative elements that likewise correspond to the elements recited in the claims.

What is claimed is:

1. A method performed on a device having a display and a memory that stores a plurality of applications and an operating system, the method comprising:
    identifying an active application selected from the plurality of applications;
    rendering on the display a representation of a keyboard;
    overlaying first shortcut command indicia on corresponding keys of the representation, the first shortcut command indicia corresponding to shortcut command functions available to the active application;
    overlaying second shortcut command indicia on at least one remaining key of the representation, the second shortcut command indicia corresponding to shortcut command functions available to the plurality of applications; and
    rendering a prompt to enter customized shortcut command functions associated with the active application.

2. The method of claim 1, further comprising:
    obtaining an actuation signal requesting entry of the customized shortcut command functions; and
    rendering a menu for selecting customized shortcut command functions associated with the active application.

3. The method of claim 1, further comprising overlaying customized shortcut command indicia on selected keys of the representation.

4. The method of claim 1, wherein the active application is a calculator application and the first shortcut command indicia corresponds to shortcut command functions available to the calculator application.

5. The method of claim 1, wherein the plurality of applications include at least two of a telephone application, an email application, a texting application, a browser application, a calendar application, a scheduling application, and a game application.

6. The method of claim 1, wherein the customized shortcut command functions include at least two of a copy function, a paste function, a mode switch function, a mute function, a compose message function, a reply function, a forward message function, and a reply function.

7. The method of claim 1, wherein the second shortcut command indicia corresponding to the shortcut command functions available to the plurality of applications include navigation command functions.

8. A computer program product for execution on a device having a display, the computer program product comprising a non-transitory memory device storing a plurality of applications, an operating system, and computer readable code which, upon execution of the computer readable code by a processor, causes the processor to:
    identify an active application selected from the plurality of applications;
    render on the display a representation of a keyboard;
    overlay first shortcut command indicia on corresponding keys of the representation, the first shortcut command indicia corresponding to shortcut command functions available to the active application
    overlay second shortcut command indicia on at least one remaining key of the representation, the second shortcut command indicia corresponding to shortcut command functions available to the plurality of applications; and
    render a prompt to enter customized shortcut command functions associated with the active application.

9. The computer program product of claim 8, which further causes the processor to:
   obtain an actuation signal to request entry of the customized shortcut command functions; and
   render a menu for selecting customized shortcut command functions associated with the active application.

10. The computer program product of claim 8, which further causes the processor to overlay customized shortcut command indicia on selected keys of the representation.

11. The computer program product of claim 8, wherein the active application is a calculator application and the first shortcut command indicia corresponds to shortcut command functions available to the calculator application.

12. The computer program product of claim 8, wherein the plurality of applications include at least two of a telephone application, an email application, a texting application, a browser application, a calendar application, a scheduling application, and a game application.

13. The computer program product of claim 8, wherein the customized shortcut command functions include at least two of a copy function, a paste function, a mode switch function, a mute function, a compose message function, a reply function, a forward message function, and a reply function.

14. The computer program product of claim 8, wherein the second shortcut command indicia corresponding to the shortcut command functions available to the plurality of applications include navigation command functions.

15. A device comprising:
   a display;
   a keyboard;
   a non-transitory memory device storing a plurality of applications and an operating system;
   a processor in signal communication with the display, the keyboard, and the non-transitory memory device, the processor being configured to:
      identify an active application selected from the plurality of applications;
      render on the display a representation of the keyboard;
      overlay first shortcut command indicia on corresponding keys of the representation, the first shortcut command indicia corresponding to shortcut command functions available to the active application;
      overlay second shortcut command indicia on at least one remaining key of the representation, the second shortcut command indicia corresponding to shortcut command functions available to the plurality of applications; and
      render a prompt to enter customized shortcut command functions associated with the active application.

16. The device of claim 15, wherein the processor is further configured to:
   obtain an actuation signal to request entry of the customized shortcut command functions; and
   render a menu for selecting customized shortcut command functions associated with the active application.

17. The device of claim 15, wherein the processor is further configured to overlay customized shortcut command indicia on selected keys of the representation.

18. The device of claim 15, wherein the processor is further configured to render a calculator application as the active application and the first shortcut command indicia corresponds to shortcut command functions available to the calculator application.

19. The device of claim 15, wherein the plurality of applications include at least two of a telephone application, an email application, a texting application, a browser application, a calendar application, a scheduling application, and a game application.

20. The device of claim 15, wherein the customized shortcut command functions include at least two of a copy function, a paste function, a mode switch function, a mute function, a compose message function, a reply function, a forward message function, and a reply function.

\* \* \* \* \*